No. 765,874. PATENTED JULY 26, 1904.
F. A. BLAIN.
COTTON THRESHER AND CLEANER.
APPLICATION FILED APR. 18, 1904.
NO MODEL.
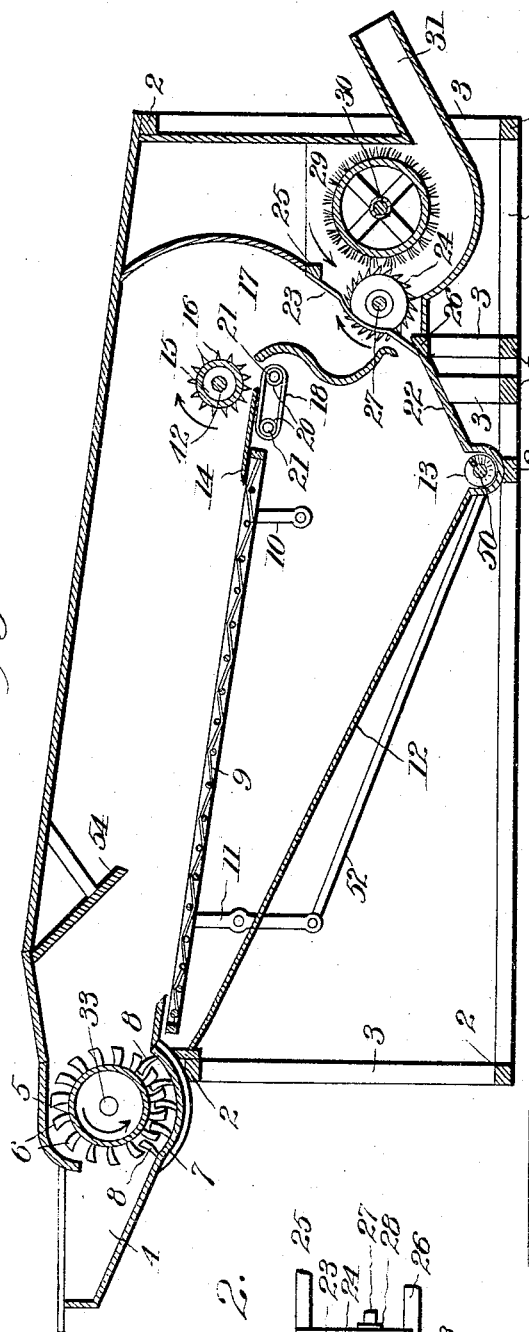
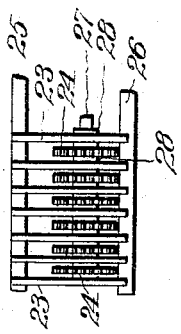
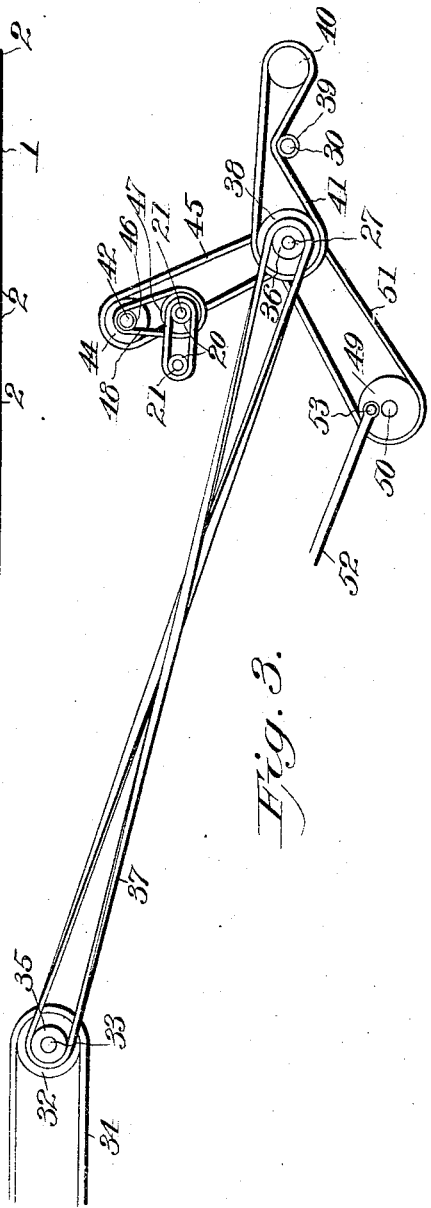
Witnesses
J. W. Stitt
L. T. Knight
Inventor,
F. A. Blain.
By A. L. Jackson,
Attorney No. 765,874. Patented July 26, 1904.

UNITED STATES PATENT OFFICE.

FRANK A. BLAIN, OF FORT WORTH, TEXAS.

COTTON THRESHER AND CLEANER.

SPECIFICATION forming part of Letters Patent No. 765,874, dated July 26, 1904.

Application filed April 18, 1904. Serial No. 203,696. (No model.)

*To all whom it may concern:*

Be it known that I, FRANK A. BLAIN, a citizen of the United States, residing at Fort Worth, Texas, have invented a new and useful Cotton Thresher and Cleaner, of which the following is a specification.

This invention relates to a machine for preparing cotton for ginning purposes, and more particularly to a machine for opening immature bolls and gathering the cotton therefrom and preparing the same for ginning; and the object is to prepare or produce a machine which will break immature bolls of cotton open and separate the cotton from the hulls and trash, so that the cotton is ready to be ginned. For many years cotton of this kind has been generally lost, being considered of little or no value. One difficulty in the way of making use of such cotton was that the bolls were not open, and no way of gathering the cotton was known. The machine herein described has been found entirely satisfactory for opening such bolls and separating the cotton from the hulls.

Other objects and advantages will be fully explained in the following description, and the invention will be more particularly pointed out in the claims.

Reference is had to the accompanying drawings, which form a part of this application and specification.

Figure 1 is a vertical section of the entire machine. Fig. 2 is a front view of a portion of the gin ribs and saws. Fig. 3 is a diagrammatic view of the driving-gear of the machine.

Similar characters of reference are used to indicate the same parts throughout the several views.

This invention is provided with a suitable frame consisting of longitudinal beams 1, cross-beams 2, and upright posts 3. The machine is provided with a suitable casing for inclosing the operating mechanism. The material operated upon is inclosed from the time the bolls pass the breaking-cylinder until the cotton is ready for the gin. Means are provided for breaking open the immature bolls. The bolls are gathered from the stalks of cotton after they are dry. The term "immature" has been used to describe the class of cotton-bolls to be operated upon. Immature bolls mean those that are just about mature and for some cause do not mature sufficiently to open, as bolls that have been subject to heavy frosts. Sometimes the bolls are mature; but they are so shaded by the cotton-leaves that they do not open. The object of this invention is to produce a machine which will open all such bolls and thresh the cotton out and separate the hulls from the cotton, so that the cotton may be ginned as other cotton is ginned. The bolls are placed in a hopper 4, so that they will be fed to a breaking-cylinder 5, which is provided with teeth. This cylinder is provided with any suitable number of teeth, which are so placed that they will pass between rows of teeth 8, which are mounted in a concave 7. The teeth 6 of the cylinder and the teeth 8 of the concave must be placed so that the cylinder-teeth will break the hulls of the bolls against the teeth of the concave without breaking the cotton-seed. The cotton-bolls are thoroughly broken to pieces as they pass through the teeth of the cylinder and the concave. The cylinder may be revolved at any suitable rate of speed. The cotton and hulls fall on a screen 9, preferably made of wire mesh. This screen is made to vibrate or shake, so that the cotton and the hulls will travel thereon. The screen 9 is mounted in the casing on pivoted arms 10 and 11. One of the arms 11 may be extended through the bottom of the casing for forming a lever for vibrating the screen. As the cotton and hulls pass along on the screen the smaller pieces of the hulls fall through the screen on the inclined bottom 12 of the casing and work or slide down to the spiral conveyer 13, which carries the dirt and hulls out at one side of the machine. The cotton and larger pieces of hulls pass along the screen and are delivered onto a sheet-metal slab or platform 14, which extends across the inside of the machine flush almost with the upper side of the end of the screen. A revolving picker-cylinder 15, provided with teeth 16, picks the cotton from among the hulls and throws the same over into the compartment 17, where it comes in contact with saw-teeth. This operation will leave the greater portion of the broken hulls. Means are provided for taking these hulls away from the picker-cylinder. A traveling belt or apron 18 is mounted below and practically flush with the platform 14 on drums 20, which are provided with shafts 21. This apron 18 will dump the pieces of hulls which have been left by the picker-cylinder into the lower part of the casing, whence they will be conveyed away out of the machine by the conveyer 13. The last pieces of hulls will be taken out of the cotton in compartment 17 and fall down on the inclined portion 22 of the casing and slide to the spiral conveyer 13. The cotton and the seed will be drawn through the ribs 23 by the saws or teeth 24. Care must be exercised in placing the ribs 23 in the machine. These ribs may be placed about three-eighths of an inch apart. The object is to place these ribs far enough apart to allow the cotton, with the cotton-seed, to pass therethrough when drawn by the teeth 24 and close enough to the teeth to prevent the hulls from passing through with the cotton. The ribs 23 are attached to the cross-beams 25 and 26, and the teeth 24 are mounted on the shaft 27, with suitable space-blocks 28 placed between the same. A suitable brush 29, mounted on shaft 30, takes the cotton and seed from the teeth 24 and forces the cotton and seed out the chute 31 to the gin. (Not shown.) The machine may be driven from any suitable source of power. A practical set of gearing for driving the various cylinders is shown in Fig. 3. A pulley 32 is mounted on the shaft 33 of the breaking-cylinder 5, and a belt 34 drives this pulley, which is to be rigid with shaft 33. A pulley 35 is mounted rigidly on the shaft 33, and a pulley 36 is mounted on shaft 27. A crossed belt 37 is mounted on pulleys 35 and 36 for driving the shaft 27 of the saw-cylinder 24. A pulley 38 is rigidly mounted on the shaft 27, a pulley 39 is rigidly mounted on the shaft 30 for driving the brush-cylinder 29, and an idler 40 is mounted on the casing of the machine. A belt 41 is mounted on pulleys 38 and 40 and runs over pulley 39 for driving these pulleys. The picker-cylinder 15 is mounted on shaft 42 and is driven by the pulley 44, mounted on shaft 42, and by belt 45, which is driven from the shaft 27. One of the drums 20 is driven from the shaft 42. A pulley 46 is mounted on shaft 42, and a pulley 47 is mounted on the drum journal or shaft 21, and a belt 48 drives these pulleys. The spiral conveyer may be driven from shaft 27. A pulley 49 is mounted on shaft 50 of the spiral conveyer 13, and a belt 51 drives pulley 50 from a pulley on the shaft 27. The screen 9 may be vibrated by the pulley 50. A link bar 52 is pivotally connected to the arm 11 and pivotally connected to a pin 53, eccentrically mounted on the pulley 50. The revolving of pulley 50 will drive the spiral conveyer and vibrate the screen 9.

A brake 54 is mounted in the upper part of the machine in an inclined position across the machine to deflect the cotton down on the screen 9 as the cotton and hulls are thrown from the cylinder 5. The greater portion and particularly the smaller portion of the broken hulls are taken out of the cotton by means of the screen 9 and the picker 15 in coöperation with the traveling belt 18.

Having fully described my invention, what I claim as new, and desire to secure by Letters Patent, is—

1. A cotton threshing and cleaning machine comprising means for breaking open the bolls of cotton, a picker for separating the cotton from the hulls, a vibrating screen for separating the smaller pieces of the cotton-boll hulls from the cotton and delivering the cotton to said picker, a separating-chamber, and means for separating the cotton with the seed thereof from the remaining hulls and delivering the same for ginning purposes.

2. In a cotton threshing and cleaning machine the combination of a concave provided with teeth, a revoluble cylinder provided with teeth adapted to pass through the teeth of said concave, a separating and delivering screen, and means for picking the cotton from the broken hulls.

3. In a cotton threshing and cleaning machine the combination of means for breaking the cotton-bolls to pieces, a vibrating screen, a platform disposed across the interior of the machine-casing, a cotton-picker for taking the cotton from said platform, a traveling apron for removing a portion of the broken hulls from said picker, and means for separating the remaining broken hulls from the cotton and delivering the cotton with the seed thereof to be ginned.

4. In a cotton threshing and cleaning machine the combination of means for opening the cotton-bolls, a preliminary revoluble picker, a vibrating screen and stationary platform for delivering the cotton and hulls to said picker, a final revoluble picker and ribs coöperating with said final picker, and means for taking the cotton and seed from said final picker and delivering the same to be ginned.

5. In a cotton threshing and cleaning machine the combination of means for opening the cotton-bolls, preliminary means for separating the cotton and the seed thereof from the hulls comprising a rotary picker and a vibrating screen and stationary platform coöperating with said screen, and a final means for separating the cotton and seed from the hulls comprising a separating-chamber, a rotary picker and ribs coöperating with said rotary picker and a brush for delivering the cotton and the seed thereof from said rotary picker.

6. In a cotton threshing and cleaning machine, a concave provided with stationary teeth, a revoluble cylinder provided with teeth coacting with the teeth of said concave, a stationary platform and a vibrating screen coöperating with said platform, a revoluble picker for taking the cotton and larger hulls from said platform, a traveling apron for taking hulls from said picker, a second revoluble picker and ribs coacting therewith, means for taking the cotton from said last-named picker and delivering the same to be ginned and a spiral conveyer for driving the hulls and trash from said machine.

In testimony whereof I set my hand, in the presence of two witnesses, this 24th day of March, 1904.

FRANK A. BLAIN.

Witnesses:
S. L. COCHRAN,
A. L. JACKSON.